United States Patent [19] [11] 4,173,983
Fishgal [45] Nov. 13, 1979

[54] METHOD OF IMPROVING THE WORKING PROPERTIES OF LIQUID SYSTEMS

[75] Inventor: Semyon I. Fishgal, Winnipeg, Canada
[73] Assignee: International Design and Development Corporation, Cedar Falls, Iowa

[21] Appl. No.: 838,580
[22] Filed: Oct. 3, 1977
[51] Int. Cl.[2] ............ G05D 7/00
[52] U.S. Cl. ............ 137/13; 137/14
[58] Field of Search ............ 137/1, 13, 14, DIG. 10

[56] References Cited

U.S. PATENT DOCUMENTS

| | | | |
|---|---|---|---|
| 2,645,279 | 7/1953 | Rossmann | 137/DIG. 10 |
| 3,099,993 | 8/1963 | Smith | 137/13 |
| 3,302,532 | 2/1967 | Graham | 137/13 X |
| 3,334,641 | 8/1967 | Bjornsen | 137/13 X |
| 3,496,955 | 2/1970 | Viemer | 137/13 |

*Primary Examiner*—Alan Cohan
*Attorney, Agent, or Firm*—Zarley, McKee, Thomte, Voorhees & Sease

[57] ABSTRACT

A method of improving the working properties of liquid systems contaminated with solids containing magnetic materials. The method lies in subjecting said contaminants to an externally applied magnetic field changing their volumes and developing stresses to breakdown and size-reduce them to unaffected size, the frequency of the field being not sufficiently high to eliminate the magnetostrictive effect of the solid contaminants.

The field is created by a liquid-cored coil, the core being a hollow, window or toroidal shape one.

The coil can be placed into the liquid or have a core being a pipe of the liquid system.

The applied frequency (f) can be equal to the resonant one $$f=0.5\ v/D,$$

where v is the velocity of sound in the contaminant material, and D is the diameter of the contaminants.

In the liquid, the oscillating magnetic field forms the regions of compression and rarefaction sufficient to cause cavitation. For the better action of the latter, the optimal temperature and static-pressure intervals can be maintained, the ventilation of cavities being prevented.

When cavitation is formed in focused oscillating field, the content of the core is mixed by paddle rotation relatively to the axis parallel to that of the symmetry of the focal region of oscillations. The paddles can be simultaneously advanced along said axis of the symmetry. In the cylindrical vibration radiator, the axis of rotation is displaced from the core axis not farther than the half core radius.

The liquid can be treated directly in the system or in a separate arrangement including a pump and a tank. Also, pumping out the liquid from one tank to another can be employed.

8 Claims, 12 Drawing Figures

METHOD OF IMPROVING THE WORKING PROPERTIES OF LIQUID SYSTEMS

BACKGROUND OF THE INVENTION

This invention relates to a method of improving the working properties of liquid systems, e.g. hydraulic and lubrication ones, which are contaminated mainly with solids possessing magnetostrictive properties.

It is well known that reliability and the longevity of both liquid (hydraulic) systems themselves and the machines they take care of (the lubrication systems of engines, compressors and others), in many respects, depend on the working properties of the used liquids.

These properties are determined, among other things, by the presence of solid contaminants in the liquid, the fineness of the latters and the state of their dispersion.

The solid contaminants are products of wear (metal filings, rubber, etc.) and oxidation of both the details (bearings, gears, seals, etc.) and the working fluid itself, or are atmosphere dust.

The solid contaminants are abrasive, cause wear, decrease (in many times) the term of liquid unit service, may wedge (depending on the size of particles) movable details (especially the plunger ones), be the cause of inoperativeness of automatic controls, be the catalysts of oil oxidation and form tarry substances when the metal and the oil are inappropriately selected.

The main known methods of liquid decontamination are the continuous removing of contaminants from the liquid by means of straining, filtering, gravitational displacement, magnetic and centrifugal separation, etc. Independent continuous or periodic purification are employed with full flow or by-pass (5–20% of the flow).

Common to all the known methods of decontamination is the quest for removing all contaminants from the liquid. Being unable to do so, filtration, for example, is assumed to be the most qualified if the size of the filtrating material calibration channel is less than the half of the minimum clearance in the sliding pair. Still being difficult, it does not go beyond the full clearance. Besides, the fine mesh filters may clog and, in some areas, even become a repository for biological growth.

In our previous application "Method of improving the working properties of fluid systems", a simple and practical method has been devised not only for the same purpose (eliminating the harmful effects of contamination) as the known ones, but for improving the liquid working properties too, and even the system components themselves.

According to that method, the fine solid contaminants are not driven-off, but destroyed up to unaffected size by, among other things, cavitation (ultrasonic or hydrodynamic one), and are intentionally retained in the liquid in dispersed state.

It has been shown that in doing so, the solid contaminants are not only neutralized (by their size reduction to unaffecting size, e.g. less than the half minimum clearance in a sliding pair), but converted into useful particles which substantially improve the antifrictional properties of the rubbing components because they fill the cavities of the worn or defective surfaces, smooth and restore the latters, extend the actual contact area, increase heat transfer between the surfaces, reduce pressure between the latters, the influence of microseizure and other undesirable friction effects. Also, the metallic particles, having a relatively large surface, absorb oil oxidation products and increase the electric conductivity of the liquid. Consequently, the electrostatic component of wear and electrostatic electricity accumulation decrease. The latter, also, adds the fire safety. Besides, oil quality is improved in response to the silent discharges (because of the metallic particles). In engines, also, the deposition of carbon and varnish decreases.

Thus, that method allows not only to diminish as it is too rigid requirements to the filtration, but to improve the system as a whole, increase its longevity and improve the antifrictional properties of rubbing components.

In many cases, the solid contaminants are metals possessing the magnetostrictive properties (changing the volume when subjected to an externally applied magnetic field at temperature below the Curie point of the material). This allows to utilize this magnetostrictive effect in order to eliminate some disadvantages of that method.

The latter agitates (by jets or ultrasonics) whole liquid volume. At this, along with the use (destroying the particles), throttling and cavitation damage the liquid and the metallic surfaces it contacts. The damage of the liquid consists of increasing its acid number and chemical activity, of decreasing its viscosity (FIG. 1), discoloration and molecular-structural breaking-down the liquids with viscous additives consisting of long hydrocarbonic chains.

SUMMARY OF THE INVENTION

The principal distinguishing characteristic of this invention is that the liquid contaminated with solids containing magnetic materials is subjected to an externally applied oscillating magnetic field changing their volumes and developing stresses to break-down and size-reduce them to unaffecting size, the frequency of the field being not sufficiently high to eliminate the magnetostrictive effect of the solid contaminants.

This provides this method with a great advantage because the energy for destroying (size reduction) the solids is transfered directly to the solids (right where it is needed) and a minimum of the energy is lost by its divergence. Also, only small liquid volumes (of a $10^{-4}$ order) are agitated, said harmful effects of cavitation being eliminated.

In many cases, for example, in engine lubrication systems, this method may be preferred to the above one as there is no need for considerably high pressure to create cavitation jets, no hydromechanical wear and considerable loss of horsepower.

The invention has also many other minor distinguishing characteristics and objectives which will be more apparent from the following detailed description, drawings and appended claims.

DESCRIPTION OF THE EMBODIMENT

According to this invention, the solid contaminants possessing magnetostrictive properties are broken-down and size-reduced to unaffecting size by changing their volumes under externally applied magnetic field at temperature below their Curie point (for our use, the latter condition is carried out in itself).

Such magnetostrictive materials are well-known and contain iron, nickel, cobalt, gadolinium and their variations.

In these materials, small regions of magnetic moments (domains) exist and are randomly aligned in one or several directions of easy magnetization when the material is demagnetized. The domains parallel to the direction of the applied external magnetic field grow in size, taking over the other differently oriented domains.

At about half saturation flux density of the material, the domains begin to rotate towards the exact direction of the applied field and during this process the material expands or contracts externally (depending on its nature, but not on the magnetic field direction) until all the domains are aligned with the applied magnetic field (saturation process).

The relative deformation $e=dD/D=KB^2$ (here dD is the change in diameter D, K is a constant of the particular material, and B is the flux density produced by the applied magnetic field) is small $[e=1\times(10^{-4}+10^{-6})]$, increases at mechanical resonance (up to $e=1.10^{-3}$), decreases in magnitude with increasing temperature (at the Curie point the material loses its magnetic properties which return after cooling down below the point), and the above relationship does not apply for fields near magnetic saturation.

The externally applied magnetic field can oscillate with subsonic, sonic or ultrasonic frequency, the latter being not sufficiently high to eliminate the magnetostrictive effects of the solids. At this the latters are caused to change their volumes with the same oscillation frequency. The magnetic field is created by passing electrical current via an inductance coil surrounding the liquids or being surrounded by it.

If the frequency (f) of the oscillatory current (and hence of the magnetic field variation) is the resonant one (the natural frequency of the particles) the amplitude of vibration is magnified:

$$f=0.5v/D,$$

where v is the velocity of sound in the material of the particle.

Maximum static stress for a magnetostrictive material is equal to the product of Yong's modulus and the saturation magnetostrictive strain (the tensile stress developed in, for example, nickel is about $1.10^3$ psi).

This strain is temperature-dependent and a function of any superimposed static stress being increased by tension and decreased by compression for materials with a negative magnetostrictive effect (e.g. nickel). The opposite effect is possessed by materials with a positive magnetostrictive effect.

The power sources for this method are the same as those for the known (ultra)sonic magnetostrictive transducers.

Figure 1:
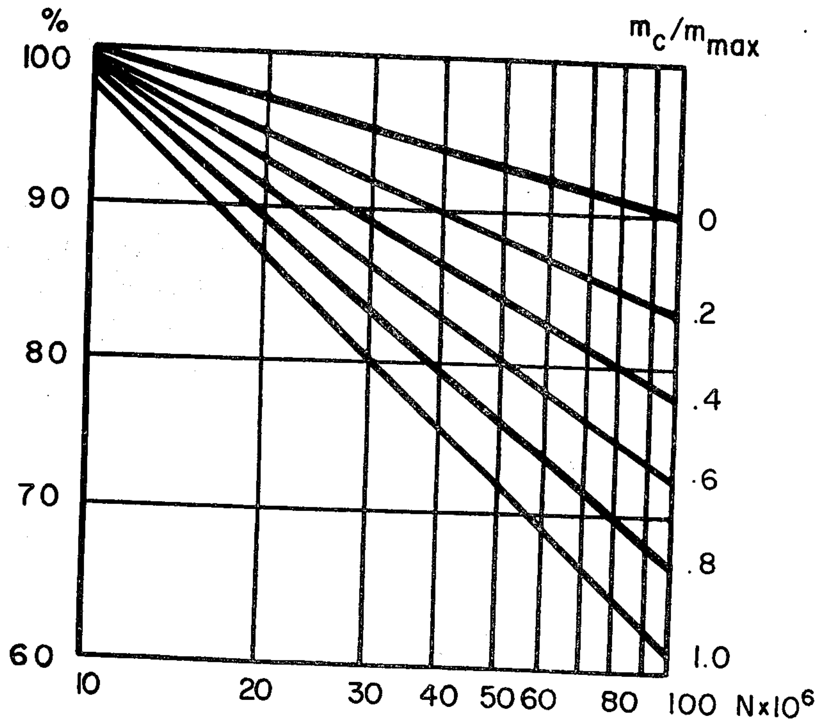
FIG. 1 (previous art) is an exemplary graph of percentage decreasing liquid viscosity according to the quantity (N) of pressure oscillations and to a current-quantity ($M_c$)-of-viscous-additive-to-maximum-one ($m_{max}$) relationship, the whole liquid volume being agitated.
Figure 2:
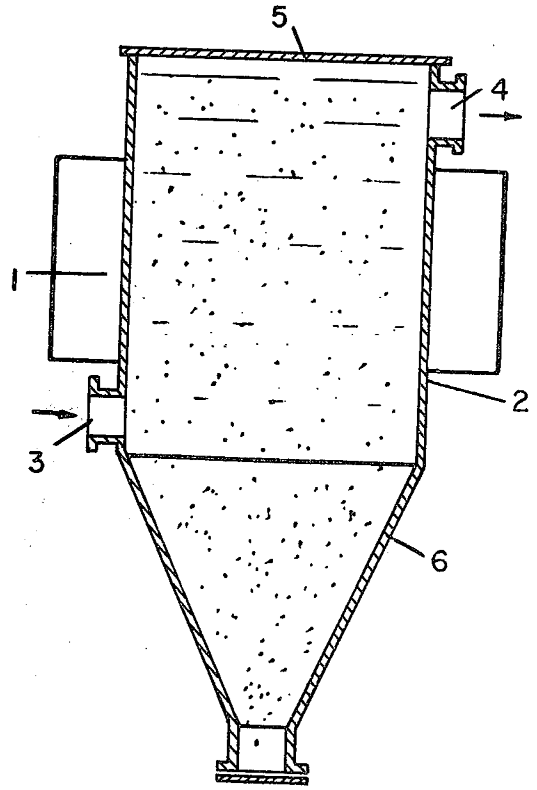
FIG. 2 is a design of a device for the treatment of liquids with a hollow core.
Figure 3:
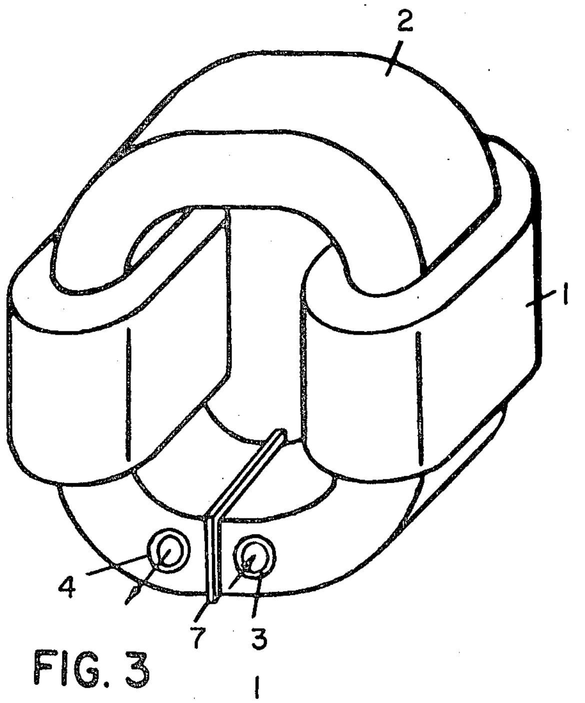
FIG. 3 is the same with a window-shape core.
Figure 4:
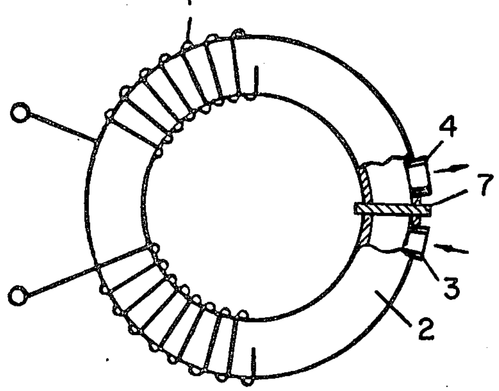
FIG. 4 is the same with a toroidal-shape core.

Applied inductance coils are the liquid-cored ones, the shell being of a non-magnetic material. The core can have a hollow (FIG. 2) and be a window (FIG. 3) or toroidal (FIG. 4) shape in which the magnetic flux can be uniform (depending on magnetostrictive particle quantity) and there is a little flux leakage.

Heat caused in the particles by eddy-current losses and mechanical and magnetic hysteresis ones is dissipated in the liquid.

The treatments of liquids can be accomplished either on a continuous or cycle basis.

After destroying and size-reducing, the solid contaminants are intentionally retained in the fluid in a dispersed state, which is achieved by hydromechanical methods. If the quantity of the dispersed particles is more than necessary for the dispersion, the residue settles down into a settler-storer (which is usually available in the filters or the tank of the liquid system) and is removed at the routine maintenance of the system.

The devices (FIGS. 2–4) consist of an inductance coil 1 with a liquid core 2 provided with an inlet 3 and an outlet 4 for the liquid to be treated. The device (FIG. 2) provided also with a cover 5 and a settler-storer 6. The devices with closed cores (FIGS. 3 and 4) have a partition 7.

Figure 5:
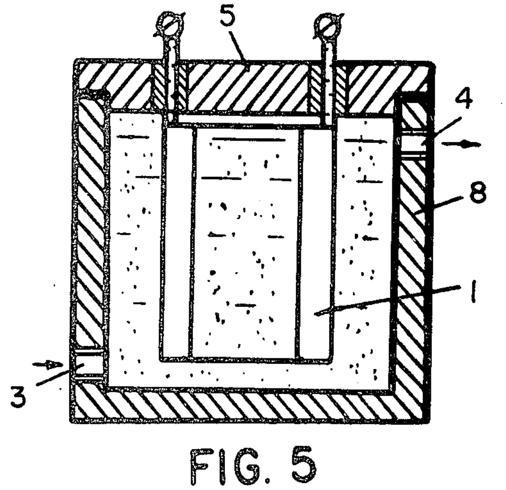
FIG. 5 is the same with the coil placed into the liquid.

In the devices (FIGS. 2–4), the core 2 is a pipe of a liquid system, but the coil 1 can be also placed into a container 8 with the liquid (FIG. 5).

If the solid contaminant particle has sharp edges, junction between dissimilar metals, etc. high local stresses are produced and the fatique strength of the particles is considerably less than the endurance limit of its material because of dynamic conditions of resonant vibrations (the stresses can readily approach 1,000 psi).

Heat produced in the solids by eddy-current losses and mechanical and magnetic hysteresis losses cause thermal stresses also beneficial for the breaking-down the solids.

If the particle has a layer of a brittle deposition (in many cases it can be a product of oil oxidation), this layer peels off first of all (if it does not absorb the oscillations of the substratum) as a result of different elasticity of the latter and the metal deforming resiliently with the applied frequency.

Above processes are greatly accelerated if the oscillations form the regions of compression and rarefaction sufficient to cause cavitation in the liquid.

Cavitation results in formation and subsequent violent collapse of vapor-gas-filled bubbles in a liquid subjected to requisite pressure changes. The formation occurs if liquid is at or below its bubble point pressure; the collapse occurs if liquid is above this pressure. The collapse produces shock waves damaging the mechanical surfaces it contacts. In our case, the pressure changes causing cavitation occur when the particles vibrate in relatively stagnant liquid.

When the particles are surrounded by liquid, the physical changes induced by intense vibration are caused by heat, cavitation, steady ultrasonic or sonic forces (which are weak compared with the cavitation forces) and large mechanical stresses (which may be due to cavitation or directly associated with (ultra)sonic waves).

The solids suspended in liquid are subjected to a steady force which arises since the viscosity of liquid does not remain constant over a pressure cycle with temperature variations.

The motion of the particles depends on their size and mass (the larger ones oscillate with a smaller amplitude). This amplitude difference also increases probability of mutual collision of the particles.

During the process of forming cavities-gas-vapor bubbles (when local pressure reduces below the gas-vapor pressure) and subjecting the cavities by higher pressure at which they collapse (since the vapor within them condenses and gas dissolves), liquid particles move to the bubble center with great speed. As a result, the kinetic energy of the colliding particles causes local hydraulic impacts accompanied by high temperature (not accounting the heat of eddy-current and hysteresis losses) and pressure sufficient to damage the hardest material of the solid boundaries exposed to the collapsing cavities.

At high temperature, chemical acting of atmospheric-oxygen bubbles (dissolved air contains 1.5 times more oxygen), electrolitic effect and oscillations fatigue the particles. In addition, hydraulic microimpacts destroy an oxidation film delaying metal oxidation in usual conditions.

For the bubble formation, a nucleus is required. It may be a small bubble already existing in the liquid, a small pocket of gas in a crack in the particles or in the wall of the vessel, the particle itself, some defect or void in the structure of the liquid, etc.

Thus the particles are not only the source of cavitation, but also its nuclei. That is why it is very tempting to utilize this phenomenon for their destruction. In this case, the pressure pulses are generated right where they are needed (on the particle surface). This provides this method with a great advantage because the energy for their destruction is transfered directly to the particles and a minimum is lost by divergence of energy. The required one is relatively modest, but concentrated over a small area and produces very high local stresses.

If cavitation occurs close to the atmosphere layer, the air tends to leak into the liquid and cushions the collapse, the shock and destructive force being consequently decreased. To increase the latter, it is necessary to prevent ventilation of the cavities.

Any cavitation process is temperature dependent because it depends on the liquid temperature-dependent characteristics. Those of vapor-pressure, surface tension, the diffusion rates of dissolved-in-liquid gases, and chemical activity of liquid increase when temperature is raised, with the solubility of gases in the liquid decreasing.

The temperature rise may, at first, lower the cavitation threshold and thereby intensify the cavitation. The gas content of liquid reduces as the temperature rises and increases bubble compressibility and shock pressure. These actions provoke still more erosion intensification. However, further temperature rise increases the pressure of saturated vapor and lowers the pressure impact of slamming cavities.

These contrary effecting factors may cause the optimal temperature interval of cavitation processes.

The dissolution of air being lower in organic-origin liquids (kerosene-1.25 times, oil-1.8 times, benzene-10 times), than in water, and vapor pressure and surface tension being higher (alcohol and petroleum-3 times, oil-2), the pressure of cavitation microimpacts and erosion in water are higher (in comparison with kerosene at the optimal temperature-2 times, benzene-5, alcohol and acetone-6).

Higher viscosity liquids slow up the rate of bubble growth and lower cavitation intensity (also, because they have more dissolved air).

Liquids of higher density show greater inertion and lower cavitation erosion too.

If hydrostatic pressure rises, cavitation slamming pressure and erosion increase. However, sufficiently high pressure can suppress cavitation by rising the cavitation threshold too high. The optimal pressure interval may be 3-5 kgf/cm$^2$.

It can be seen that cavitation process is determined by many factors with complicated dependencies. That is why the investigation of the cavitation process cannot give quantitative data of technological efficiency and erosion intensity. This investigation only points out the qualitative nature of the process.

If the liquid to be treated contains the contaminants not possessing the magnetostrictive properties (solids, gas and other liquids), these contaminants are also the nuclei of cavitation, although do not cause vibration itself (in comparison with the magnetostrictive particles).

Figure 6:
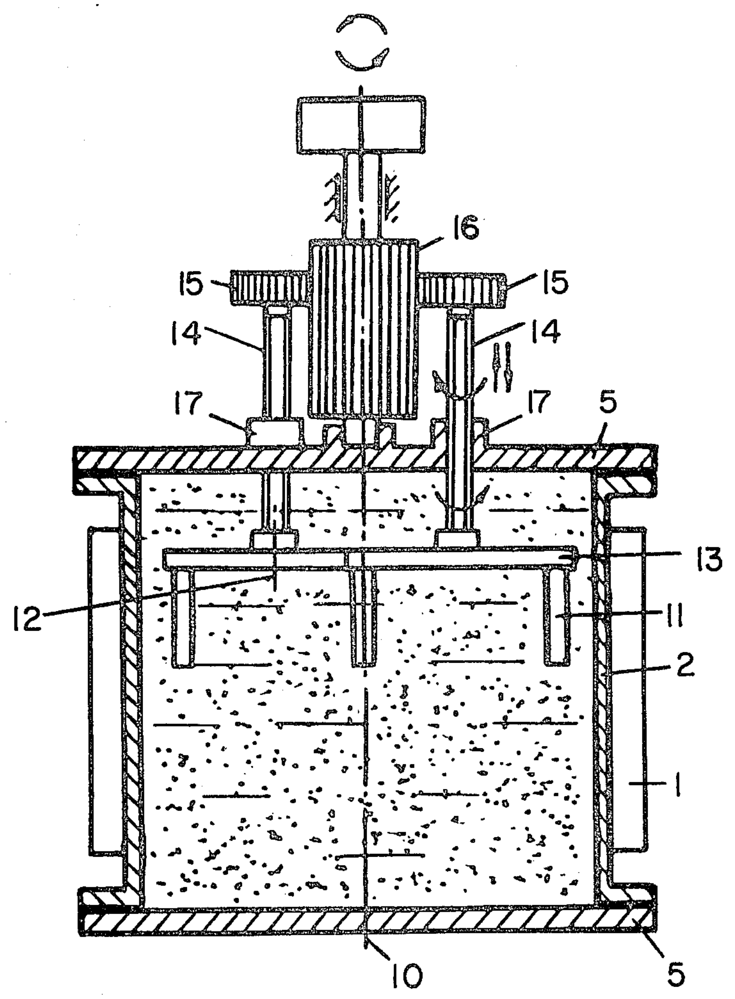
FIG. 6 is a design of a device for the treatment of liquids, mixing being provided.

The intensity of (ultra)sonic cavitation is non-uniform. In the cylindrical radiator (FIG. 6), for example, intensive cavitation region is the column along the longitudinal axis 10 (the focal cavitation region). That is why mixing the core content is provided. This mixing is achieved by rotation of paddles 11 relatively the axes 12 parallel to that 10 of the symmetry of the focal region of (ultra)sonic oscillations. The paddles 11 are simultaneously advanced along the axis 10 of the symmetry. The axes 12 of the rotation are displaced from the core axis 10 farther than the half of the core radius.

The working volume is formed by a core 2 of a cylindrical coil (radiator) 1 and covers 5. The paddles 11 are placed on several discs 13 attached to screws 14 with gears 15 and 16. There are several such arrangements situated on the circumference of the core 1.

When the gear 16 rotates the paddles 11 via the gears 15, the rotated screws 14 advance along their axes 12 in nuts 17. At this the paddles 11 are displaced on helicoidal line and consequently pass through all cavitation regions. In end positions of the longitudinal displacement, the gear 16 is reversed.

Such mixing gives the equal treatment to the particulates independently on cavitation intensity distribution in the working volume.

There are many ways in which the above units can be mounted, varying according to the application, and this does not exclude the use of usual purification devices (filters, centrifuges, etc.).

Figure 7:
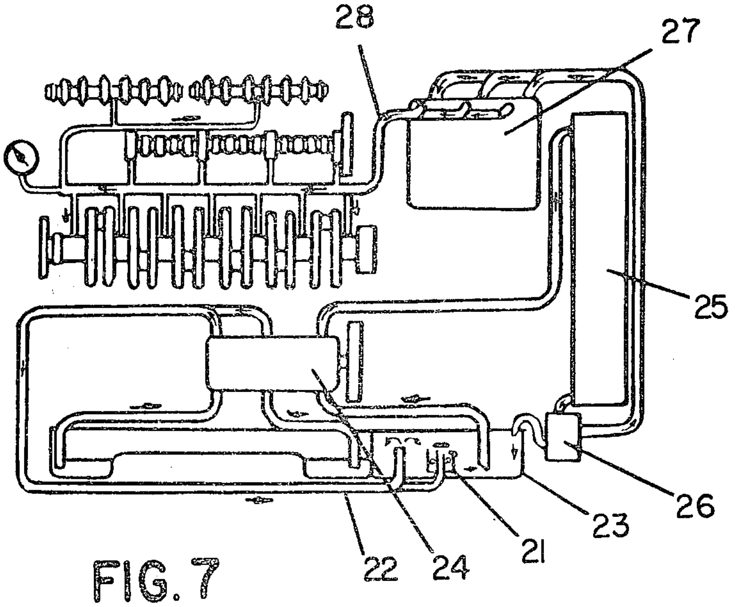
FIG. 7 is a schematic diagram illustrating the installation of one of the above devices into an exemplary lubrication engine system with a dry sump.

On FIG. 7, as on the others, the installation of the like devices is shown by way of illustration, but not of limitation, in an exemplary lubrication engine system with a dry sump.

The system contains the device 21 installed into a by-pass return line 22 on an oil tank 23, a pump 24, and oil cooler 25 with a by-pass valve 26, a filter installation 27 and a main line 28.

Oil flows down into a recess in the front and rear parts of the crankcase and is continuously pumped by the pump 24 through the oil cooler 25 and the filter installation 27 into the main line 28. Through the device 21, 15–25% of the flow passes by.

In a lubrication engine system with a wet sump (not shown on the drawings), the device 21 can be installed on the delivery side of the system. In this case, the oil flows through the device to the crankcase.

Now before turning our attention to other possible installations, it is expedient to take a view of the results.

Figure 8:
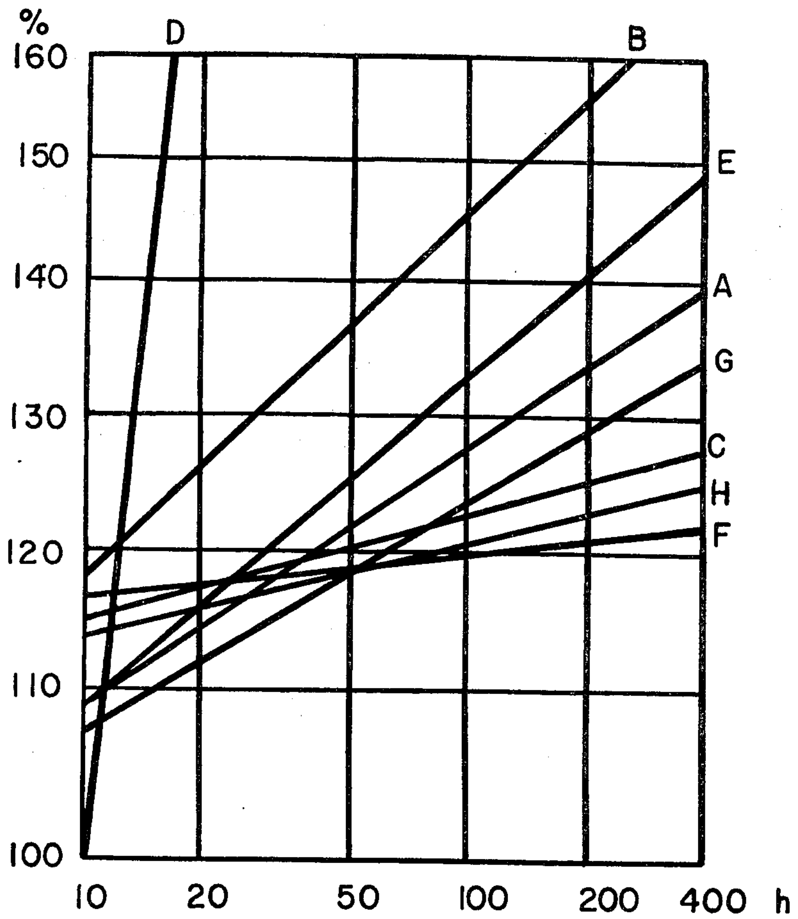
FIG. 8 is a graph with the percentage lines showing the improvement of the working properties of a diesel lubrication system for the factors of acidity (line A), alkalinity (line B), sliming on filters (line C), metallic contaminants (line D), wear (line E), friction (line F), electroconductivity (line G) and deposition of carbon and varnish (line H)

The percentage of improving the working properties of engine lubrication systems by means of destroying and dispersion of the solid contaminants directly in the system at 20% of the full flow is shown on FIG. 8.

At the usual operating conditions in lubrication lines (4–7 kgf.s$^{-2}$ pressure and 60°–90° C. temperature) this method improves the factors of acidity (characterizing the degree of oil oxidation) on 10–40%, alkalinity (characterizing undepleted additive)-20–60%, sliming on the filters-15–30%, metal contaminants (characterized by us as a positive phenomenon)-up to 400%, wear-on 25–35%, friction-20%, electroconductivity-30%, the deposition of carbon and varnish-20%, the size of the solid particles is quartered (from 10–15 mkm). These data based on 400 hours work of the same oil show the possibility of lubrication oil to serve in engines at least 2 times longer.

The lines A–H can be found by means of comparison of the working properties of untreated and treated fluids operating in similar conditions.

The acidity and the alkalinity can be determined by known method, e.g. by measurement of electrical potential or by means of indicators, comprising a class of weak acid or basic compounds which change color by reaction with the liquid.

Sliming on filters is compared by weighing, metal contaminants-by settling and weighing, friction-by tribometers.

It should be noted that the oil film can become nonconducting if its thickness is slightly increased. This is characterized by increasing the film resistance of several orders. That is why the electrical conductivity of thin liquid films can be studied by means of fluid filling the gap between the tips of a micrometer, applying a voltage to the tips and measuring the gap at the same volt-ampere characteristic, which can be recorded, for example on the screen of an oscillograph. Such a result is shown on FIG. 8 (line G).

Antiwearing properties can be assessed by the indentations on the sliding surfaces and by measuring their wear. The deposition of carbon and varnish can be measured in the same way.

Figure 9:
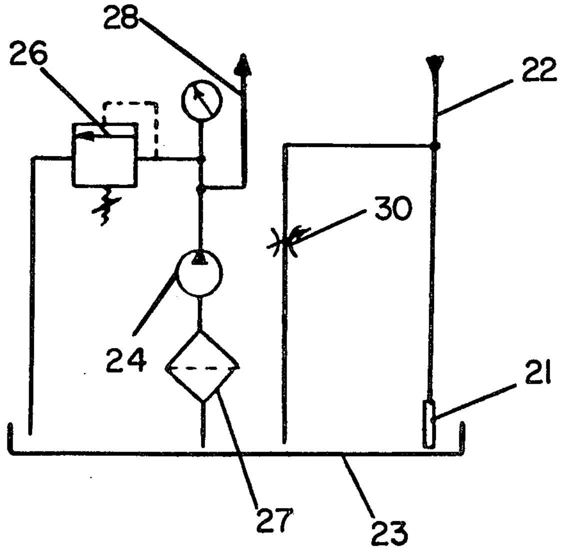
FIG. 9 is a schematic diagram illustrating the installation of the device into an exemplary hydraulic system.

In hydraulic systems, the alternate method of partial flow of the working liquid can be applied (FIG. 9).

A variable orifice 30 limits the volume of liquid that can return directly to a tank 23 through a return line 22. Excessive return flow is delivered through the device 21.

Figure 10:
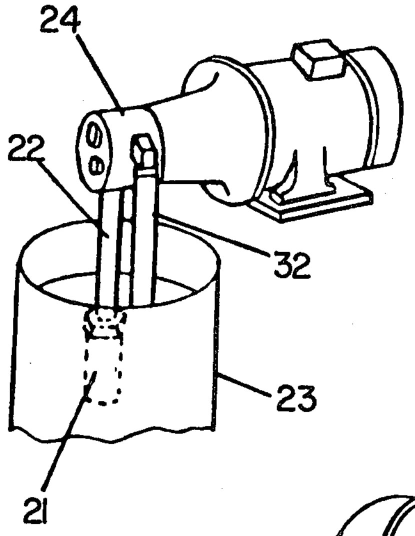
FIG. 10 is the view of a separate arrangement with the device.

The destroying-dispersing device can be a separate arrangement (FIG. 10) composed of the device 21, a tank 23, a pump 24, a return line 22 and an inlet line 32.

The liquid to be improved is poured out into a tank 23 and circulates through the circuit: a tank 23-the inlet line 32-the pump 24-the return line 22-the device 21-the tank 23.

Figure 12:
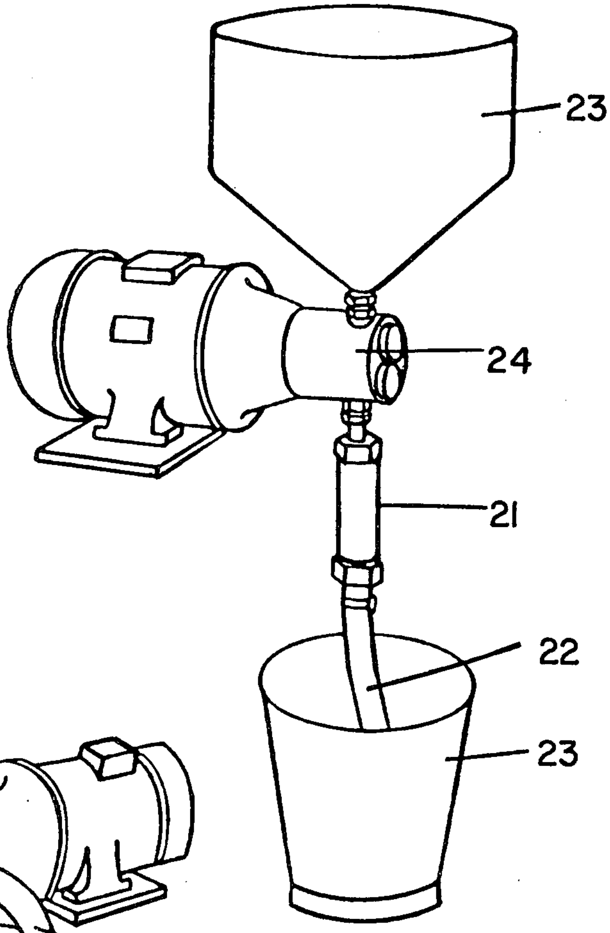
FIG. 12 is the same with an overhead funnel.
Figure 11:
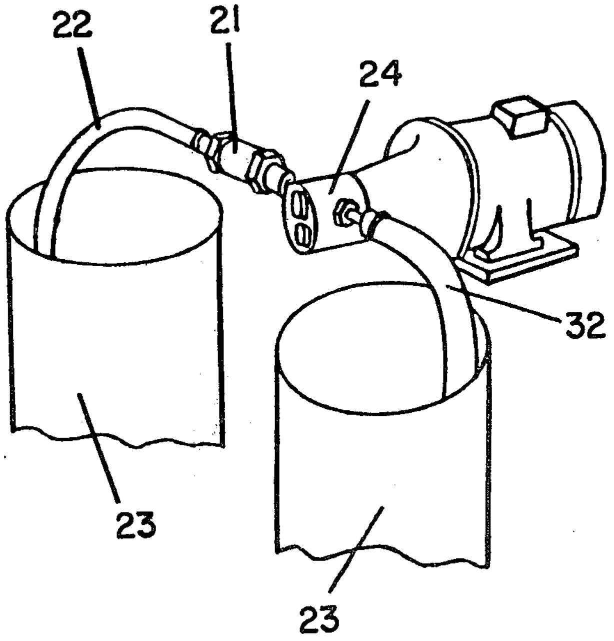
FIG. 11 is the same operating with two liquid tanks.

The device 21 can be also installed into a separate arrangement operating with two tanks (FIG. 11) or with the special overhead funnel (FIG. 12).

In the first case, the liquid to be improved is pumped out of one tank 23 into another through the inlet line 32, the pump 24, the device 21 and the return line 22; in the second case, liquid flow is the same, except there is no inlet pipe.

It is to be understood that this description is exemplary and explanatory, but not restrictive. Also, the invention is not limited to the specific details shown and described. Departures may be made without departing from the scope of the invention and without sacrificing its chief advantages.

I claim:

1. A method of breaking down contaminants containing magnetic materials in liquids of hydraulic systems to a size not interferring with hydraulic units of said systems by means of subjecting a volume of the contaminated liquid to an externally applied oscillating magnetic field changing the volumes of the contaminants and developing the stresses in them enough for their break down, the frequency of the field being not sufficiently high to eliminate the magnetrostrictive effect of the contaminants.

2. The method of claim 1 wherein said frequency is equal to the resonant one $$f=0.5v/D,$$

where f is the frequency;

v is the velocity of sound in the contaminant material;

D is the diameter of the contaminants.

3. The method of claim 1 wherein said field is strong enough to form the regions of compression and rarefaction sufficient to cause cavitation in the treated liquid.

4. The method of claim 1 wherein a liquid-cored coil is connected with a source of alternating current and the core of the coil having a capacity with the treated liquid such as a pipe or tank of the hydraulic system.

5. The method of claim 4 wherein said capacity is provided with a mixing device.

6. The method of claim 5 wherein said device consists of paddles rotating along the longitudinal axis of the coil.

7. The method of claim 6 wherein said paddles are installed on a screw rotating and advancing along said axis by means of gears and a nut fixed in the coil.

8. The method of claim 6 wherein said screw is displaced from said axis not farther than the half core radius.

* * * * *